United States Patent
Yuan

(10) Patent No.: US 10,982,681 B2
(45) Date of Patent: Apr. 20, 2021

(54) FAN BLADE STRUCTURE AND CENTRIFUGAL FAN

(71) Applicant: ASIA VITAL COMPONENTS (CHINA) CO., LTD., Shenzhen (CN)

(72) Inventor: Mei-Hua Yuan, Shenzhen (CN)

(73) Assignee: Aia Vital Components (China) Co., Ltd., Shenzhen (CN)

( * ) Notice: Subject to any disclaimer, the term of this patent is extended or adjusted under 35 U.S.C. 154(b) by 83 days.

(21) Appl. No.: 16/108,100

(22) Filed: Aug. 22, 2018

(65) Prior Publication Data

US 2020/0063750 A1 Feb. 27, 2020

(51) Int. Cl.
| F04D 29/30 | (2006.01) |
| G06F 1/20 | (2006.01) |
| F04D 17/16 | (2006.01) |
| F04D 29/42 | (2006.01) |

(52) U.S. Cl.
CPC .......... F04D 29/30 (2013.01); F04D 17/16 (2013.01); F04D 29/4226 (2013.01); G06F 1/20 (2013.01)

(58) Field of Classification Search
CPC .... F04D 29/30; F04D 29/324; F04D 29/4226; F04D 29/424; F04D 29/4246; F04D 29/4253; F04D 17/08; F04D 17/16; G06F 1/20
See application file for complete search history.

(56) References Cited

U.S. PATENT DOCUMENTS

| 5,979,541 | A | * | 11/1999 | Saito | H01L 23/467 165/122 |
| 6,765,326 | B1 | * | 7/2004 | Nakazono | F04D 29/063 310/90 |
| 7,044,720 | B1 | * | 5/2006 | Yamamoto | F04D 29/30 415/102 |
| 8,215,918 | B2 | * | 7/2012 | Hwang | F04D 29/681 416/231 B |
| 9,169,844 | B2 | * | 10/2015 | Lin | F04D 25/0613 |
| 2005/0214114 | A1 | * | 9/2005 | Huang | F04D 29/4226 415/206 |
| 2005/0249604 | A1 | * | 11/2005 | Wu | F04D 29/30 416/244 R |
| 2009/0000403 | A1 | | 1/2009 | Magnussen et al. | |

(Continued)

FOREIGN PATENT DOCUMENTS

| CN | 105090104 A | 11/2015 |
| TW | 553322 | 9/2003 |

*Primary Examiner* — Courtney D Heinle
*Assistant Examiner* — Maxime M Adjagbe
(74) *Attorney, Agent, or Firm* — Bradley J. Thorson; DeWitt LLP

(57) ABSTRACT

The present invention relates to a fan blade structure and a centrifugal fan. The centrifugal fan comprises a fan case having a first inlet and an outlet and a fan blade structure received in the fan case. The fan blade structure comprises a hub and a plurality of blades disposed at the outer edge of the hub. Each of the blades has a first portion and a second portion. A virtual line extends vertically between the first portion and the second portion. The surface area of the first portion is larger than or smaller than that of the second portion. An outside space which is not vertical to a first inlet plane around the first inlet is formed between one side of the second portion of each of the blades and the inner side of the side wall of the fan case.

12 Claims, 12 Drawing Sheets

A along line A-A

(56) References Cited

U.S. PATENT DOCUMENTS

2015/0023814 A1\* 1/2015 Tamaoka ............. F04D 19/002
 417/354
2016/0111934 A1\* 4/2016 Huang .................... H02K 5/10
 417/423.7

\* cited by examiner

A along line A-A

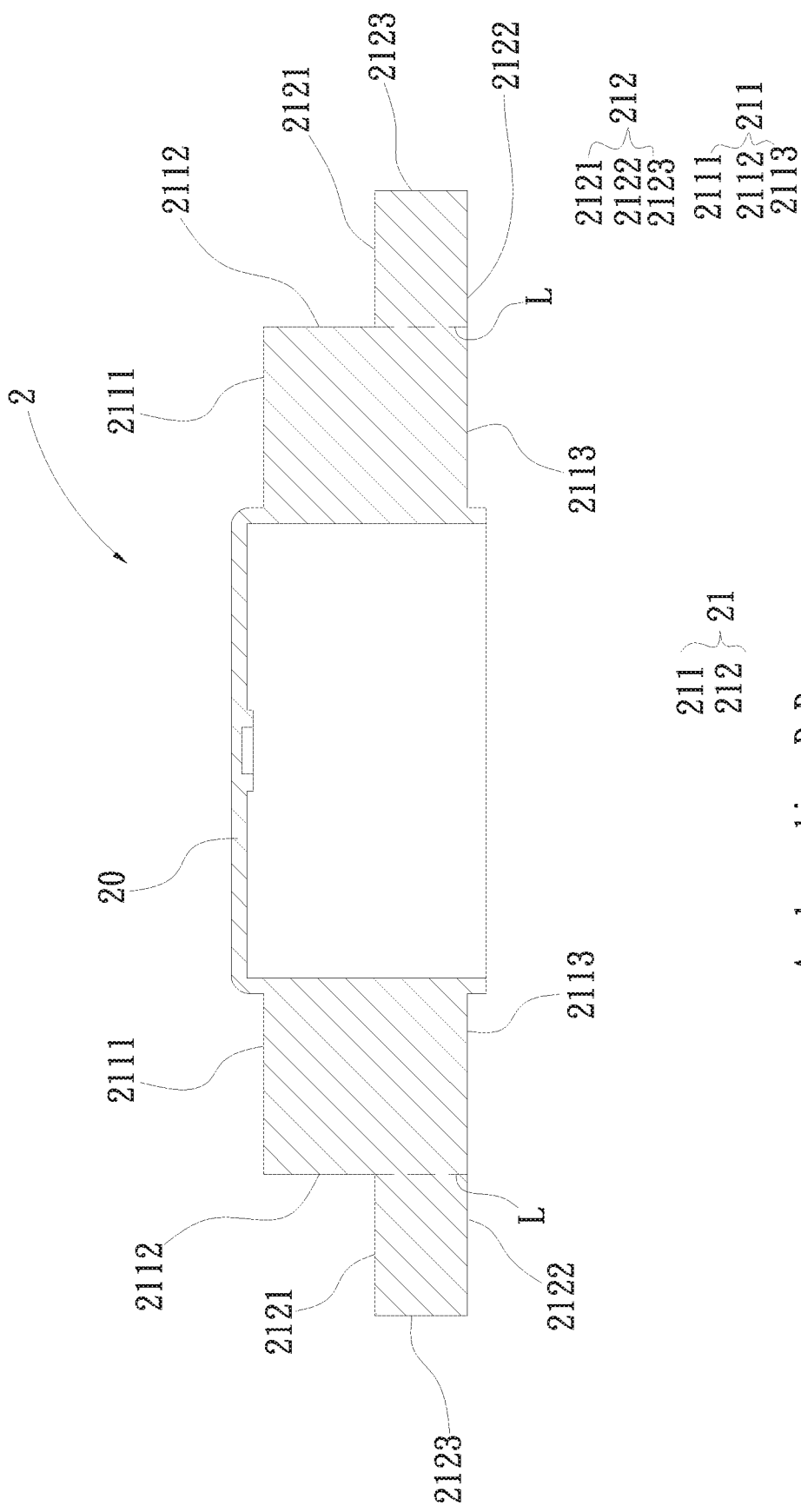

A along line C-C

FAN BLADE STRUCTURE AND CENTRIFUGAL FAN

BACKGROUND OF THE INVENTION

Field of the Invention

The present invention relates to a fan blade structure and a centrifugal fan and in particular to a fan blade structure and a centrifugal fan, which enhances the smoothness of the flow field and improves the overall efficiency of the centrifugal fan.

Description of Prior Art

The current electronic industry develops rapidly and the performance of the electronic devices continues being improved. As the operating speed of the device increases, the heat generated by the device increases accordingly. If the heat generated cannot be dissipated immediately, the operating performance of the electronic device will decline. What's worse is that the device will be burn out. Therefore, the centrifugal fan is usually used for heat dissipation in a limited system space.

Please refer to FIGS. 1, 2A, and 2B. The traditional centrifugal fan 1 mainly comprises a frame body 11 and a fan blade set 12. The upper part 111 and the lower part 112 of the frame body 11 individually have an inlet 13. The side surface 113 connecting to the upper part 111 and the lower part 112 has an outlet 14. The inlet planes 13a around the upper part 111 and the lower part 112 have the same sizes. Also, the side surface 113 is vertical to the upper part 111 and to the lower part 112. A receiving space 114 is disposed in the frame body 11 to receive the fan blade set 12. An air channel 15 is formed between the fan blade set 12 and the side surface 113. The air channel 15 is vertical to the upper inlet plane 13a (or the lower inlet plane 13a) around the inlet 13 of the upper part 111 (or the inlet 13 of the lower part 112). The fan blade set 12 comprises a hub 121 and a plurality of blades 122 disposed on the outer surface of the hub 121. The sides 1211 of the blades 122 far away from the hub 121 are vertical to the upper inlet plane 13a around the upper part 111 of the frame body 11 (or the lower inlet plane 13a around the lower part 112 of the frame body 11). During the operation of the centrifugal fan, the surrounding air is driven by the rotation of the blades 122 of the fan blade set 12 so that the axial air flow entering from the inlet 13 is deflected along the radial direction of the hub 121 and then is exhausted through the outlet 14.

The determination of the size of the centrifugal fan 1 used in a general system such as a notebook computer, a smart phone, a telematics system, an All-in-One system, a mini system, or IPAD) is based on the height of the smallest dimension of the applied system to specify the physical dimension of the centrifugal fan 1. However, it is difficult for an irregular system to determine a centrifugal fan 1. Two problems about the above determination usually occur. The first is that when an oversize fan is used, it will interfere with the electronic devices or other apparatus in the system. For example, the height of the shortest side of an irregular system is suitable for a three-inch centrifugal fan; however, such a choice results in the interference with the electronic devices or other apparatus (e.g., the heat dissipation apparatus or the hard disk drive) in the system or with the physical size of the system. In this case, a centrifugal fan with a proper size cannot be used. The second is that when an undersized fan is used, the performance worsens (e.g. the insufficient air flow cannot meet the cooling requirements) and then the installation of the fan is in vain and wastes the system space. For example, only the smaller centrifugal fan like a one-inch fan can be used due to the interference with internal electronic devices or other apparatus in an irregular system. However, the air flow produced by the one-inch fan is inadequate to cool the whole system rapidly, which causes a poor cooling performance of the whole system.

SUMMARY OF THE INVENTION

One objective of the present invention is to provide a fan blade structure and a centrifugal fan which can improve the fan efficiency.

Another objective of the present invention is to provide a fan blade structure and a centrifugal fan which can increase the surface area of the plural fan blades to effectively increase the air flow.

Yet another objective of the present invention is to provide a centrifugal fan which can improve the flow field condition (e.g., the smoothness of the flow field) to further enhance the cooling efficiency by means of the change of the shape of the fan case and the structure design for different sizes of the first and the second inlets on the fan case.

Yet another objective of the present invention is to provide a fan blade structure and a centrifugal fan which allow the design of the shape of the centrifugal fan and the shape of the air channel among the plural blades based on the system requirements to effectively utilize the space in the system and improve the cooling efficiency To achieve the above objectives, the present invention provides a fan blade structure which is applied in a centrifugal fan. The fan blade structure comprises a hub and a plurality of blades. The blades are disposed at the outer edge of the hub. Each of the blades has a first portion and a second portion; a virtual line extends vertically between the first portion and the second portion. The second portion extends outwards from one end of the first portion adjacent to the virtual line. The surface area of the first portion is larger than or smaller than that of the second portion. By means of the design of the fan blade structure of the present invention, the cooling effect can be effectively achieved.

The present invention also provides a centrifugal fan which comprises a fan case and a fan blade structure. The fan case is provided with a top cover, a base case, and a shaft base. The top cover is disposed on the base case. The top cover and the base case together define a receiving space receiving the shaft base. A first inlet which is disposed on the top cover or on the base case communicates with the receiving space. The base case is provided a base plate and a side wall extending upwards from the base plate. The side wall is provided with at least one outlet which communicates with the receiving space. The fan blade structure is pivoted to the shaft base in the receiving space. The fan blade structure comprises a hub and a plurality of blades disposed at the outer edge of the hub. Each of the blades has a first portion and a second portion. A virtual line extends vertically between the first portion and the second portion. The second portion extends outwards from one end of the first portion adjacent to the virtual line. The surface area of the first portion is larger than or smaller than that of the second portion. An outside space which is not vertical to a first inlet plane around the first inlet is formed between one side of the second portion of each of the blades and the opposite inner side of the side wall of the fan case. By means of the design of the centrifugal fan of the present invention, the air flow can be effectively increased. Also, the flow field situation can be effectively improved to enhance the fan efficiency and the cooling efficiency.

BRIEF DESCRIPTION OF DRAWING

FIG. 5A is a cross-sectional schematic view of FIG. 5 along line B-B;

DETAILED DESCRIPTION OF THE INVENTION

Figure 1:
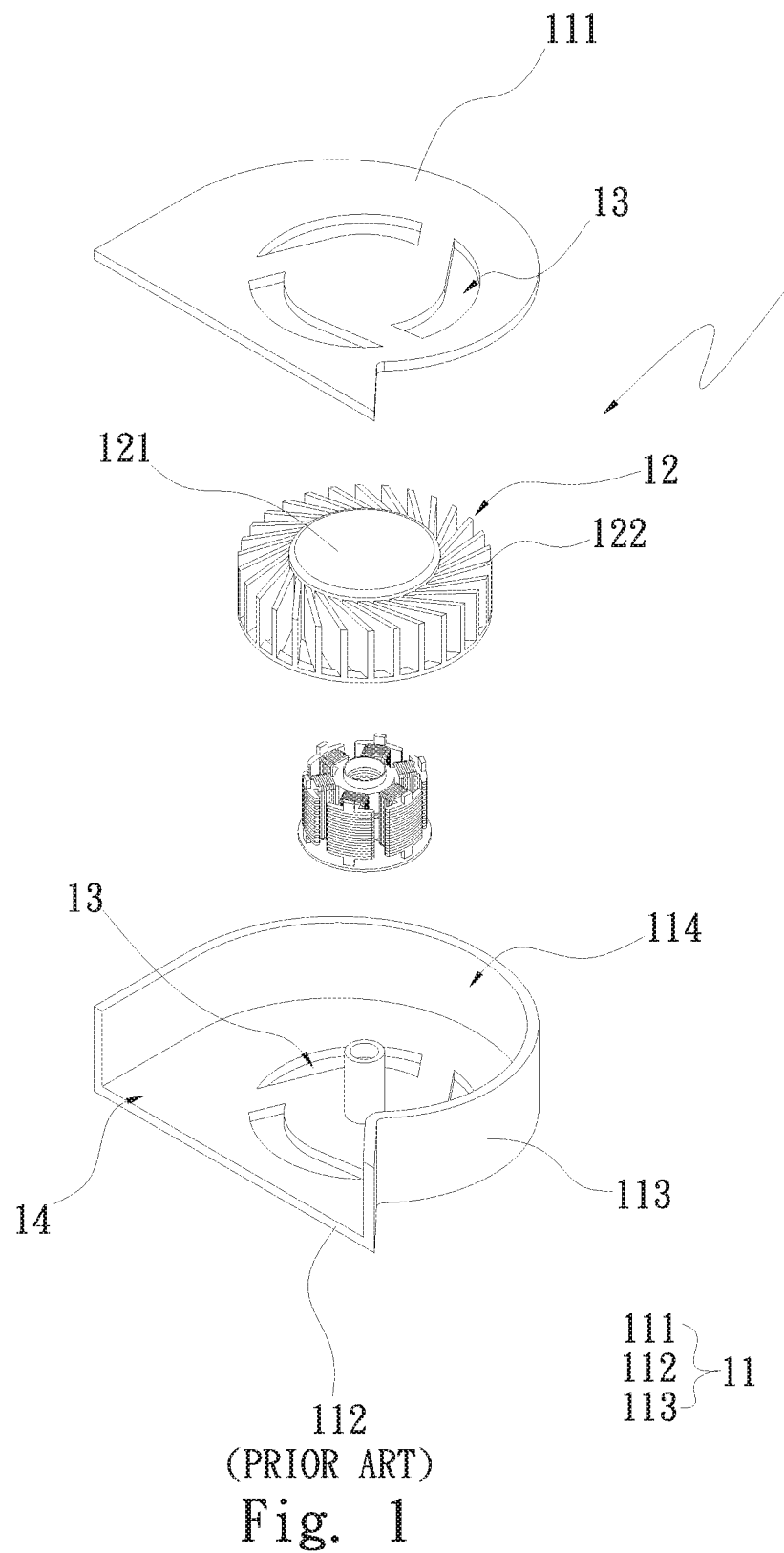
FIG. 1 is a perspective exploded schematic view of a prior art centrifugal fan.
Figure 2A:
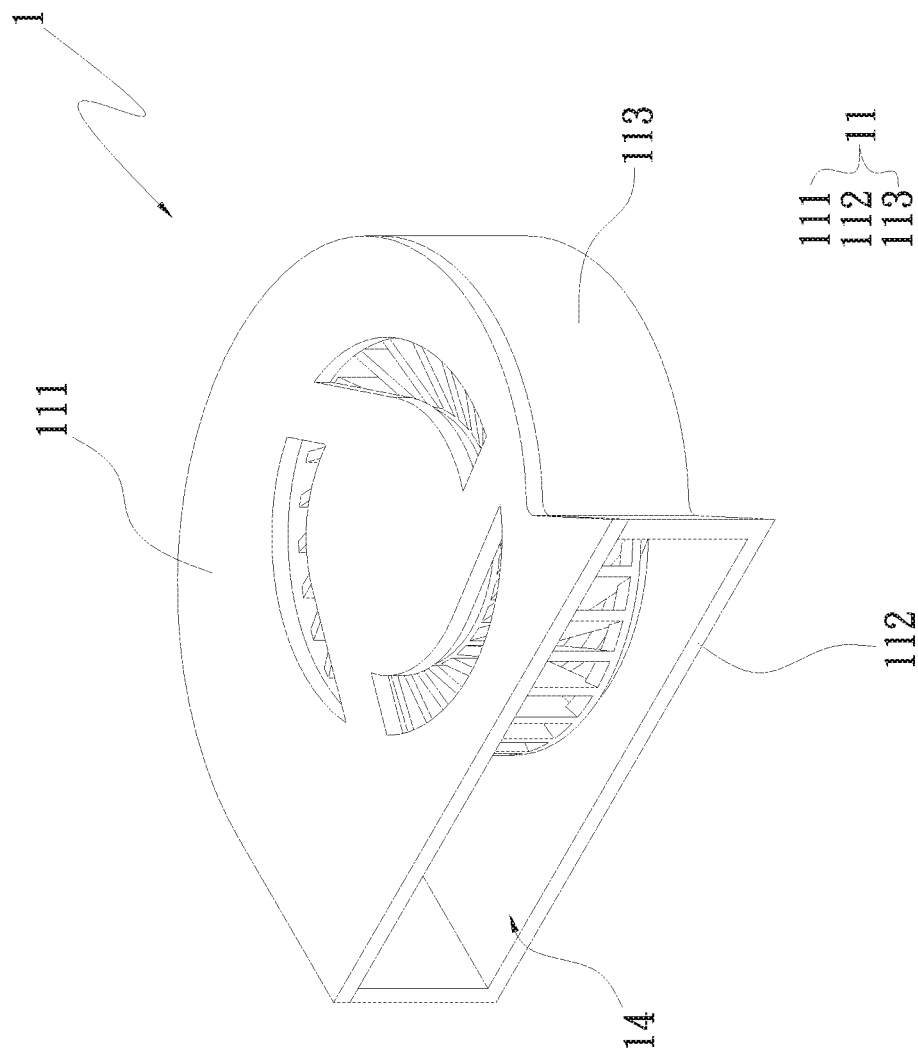
FIG. 2A is a combined perspective schematic view of a prior art centrifugal fan.
Figure 2B:
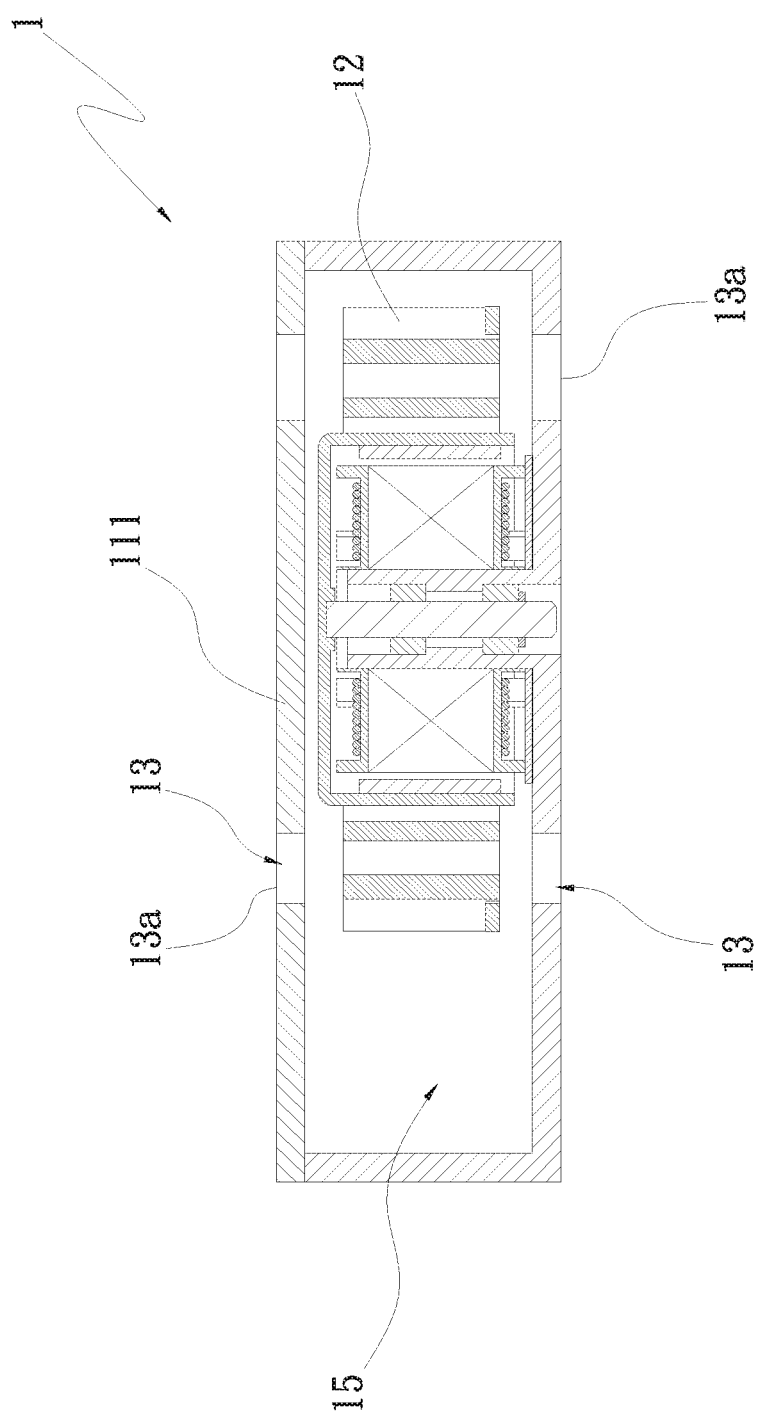
FIG. 2B is a cross-sectional schematic view of a prior art centrifugal fan.

The above objectives, structural and functional characteristics of the present invention will be described according to the preferred embodiments in the accompanying drawings.

The present invention relates to a fan blade structure and a centrifugal fan. Please refer to FIG. 3A which is a perspective schematic view of the fan blade structure according to the first embodiment of the present invention, FIG. 3B which is a cross-sectional schematic view of FIG. 3A along line A-A, FIG. 4A which is an aspect view of the fan blade structure according to the first embodiment of the present invention, and FIG. 4B which is another aspect view of the fan blade structure according to the first embodiment of the present invention. The fan blade structure 2 is applied in a centrifugal fan 3 (refer to FIG. 5). The fan blade structure 2 comprises a hub 20 and a plurality of blades 21. The blades 21 are disposed at the outer edge of the hub 20. Each of the blades 21 has a first portion 211 and a second portion 212. A virtual line L extends vertically between the first portion 211 and the second portion 212. The second portion 212 extends outwards from one end of the first portion 211 adjacent to the virtual line L. In the current embodiment, the surface area of the first portion 211 is larger than that of the second portion 212. In practice, the surface area of the first portion 211 can be designed to be smaller than that of the second portion 212.

The first portion 211 has a top surface 2111 and a bottom surface 2113. In the current embodiment, the top surface 2111 and the bottom surface 2113 are parallel with each other. One end of the top surface 2111 and one end of the bottom surface 2113 are attached at the outer edge of the hub 20. The other end of the top surface 2111 and the other end of the bottom surface 2113 are disposed far away from the outer edge of the hub, 20. The second portion 212 has a first side 2121 and a second side 2122. The first side 2121 extends obliquely and outwards (e.g. downwards and outwards) from the other end of the top surface 2111 to connect to one end of the second side 2122. The other end of the second side 2122 connects horizontally and adjacently to the other end of the bottom surface 2113. The virtual line L extends downwards and vertically from the connection between the first side 2121 and the other end of the top surface 2111 to the bottom surface 2113 correspondingly such that the first side 2121 and the second side 2122 of the second portion 212, and the virtual line L form a triangle. As shown from FIG. 3A, the surface area of the first portion 211 is the area sum of all the surfaces of the first portion 211 including the surfaces of the top surface 2111, the bottom surface 2113, and two side surfaces 2112. The surface area of the second portion 212 is the area sum of all the surfaces of the second portion 212 including the surfaces of the first side 2121, the second side 2122, and two sides of the second portion 212.

Figure 4A:
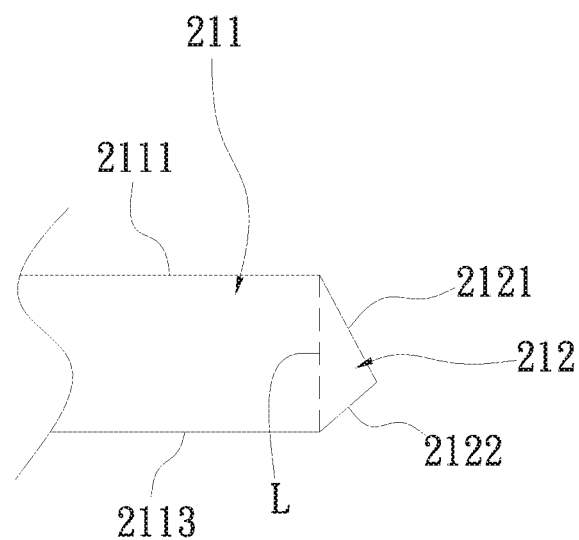
FIG. 4A is an aspect view of the fan blade structure according to the first embodiment of the present invention.

In an embodiment, referring to FIG. 4A, the first side 2121 can be designed to extends obliquely and outwards (e.g. downwards and outwards) from the other end of the top surface 2111 to connect to one end of the second side 2122. The other end of the second side 2122 connects obliquely and adjacently to the other end of the bottom surface 2113. The first side 2121 and the second side 2122 of the second portion 212, and the virtual line L form a triangle. In another embodiment, referring to FIG. 4B, the first side 2121 and the second side 2122 of the second portion 212 are designed to have irregular wave-like shapes.

In addition, each of the blades 21 is provided with a windward side 214 and a leeward side 215 corresponding to the windward side 214. The windward side 214 and a leeward side 215 are individually disposed on two sides of the blade 21. When the fan blade structure 2 rotates (e.g., counterclockwise), the side of the blade 21 of the fan blade structure 2 facing the rotating direction is defined as the windward side 214 and the other side is the leeward side 215. The windward side 214 is ahead of the leeward side 215. Also, the windward side 214 defines a first windward zone 2141 and a second windward zone 2142 shrinking gradually and outwards from the first windward zone 2141. The first and the second windward zones 2141, 2142 are disposed on one side of the first portion 211 and on one side of the second portion 212, respectively. That is, the first windward zone 2141 is disposed on the side of the first portion 211 which is located between the virtual line L and the corresponding outer edge of the hub 20; the second windward zone 2142 is disposed on the side of the second portion 212 which is located between the virtual line L and the corresponding first and second sides 2121, 2122. The shape of the first windward zone 2141 of the first portion 211 is different from that of the second windward zone 2142 of the second portion 212. For example, the first windward zone 2141 of the first portion 211 has a rectangular shape; the second windward zone 2142 of the second portion 212 has a triangular shape. In this way, the whole shape of the blades 21 is trapezoidal but the shape of the blades 21 is not limited to this.

The leeward side 215 defines a first leeward zone 2151 and a second leeward zone 2152 shrinking gradually and outwards from the first leeward zone 2151. The first and the second windward zones 2141, 2142 correspond to the first and the second leeward zones 2151, 2152, respectively. The first and the second leeward zones 2151, 2152 are disposed on the other side of the first portion 211 and the other side of the second portion 212, respectively. The first leeward zone 2151 is disposed on the other side of the first portion 211 which is located between the virtual line L and the corresponding outer edge of the hub 20. The second leeward zone 2152 is disposed on the other side of the second portion 212 which is located between the virtual line L and the corresponding first and second sides 2121, 2122. The shape of the first leeward zone 2151 of the first portion 211 is different from that of the second leeward zone 2152 of the second portion 212. For example, the first leeward zone 2151 of the first portion 211 has a rectangular shape; the second leeward zone 2152 of the second portion 212 has a triangular shape.

Figure 3A:
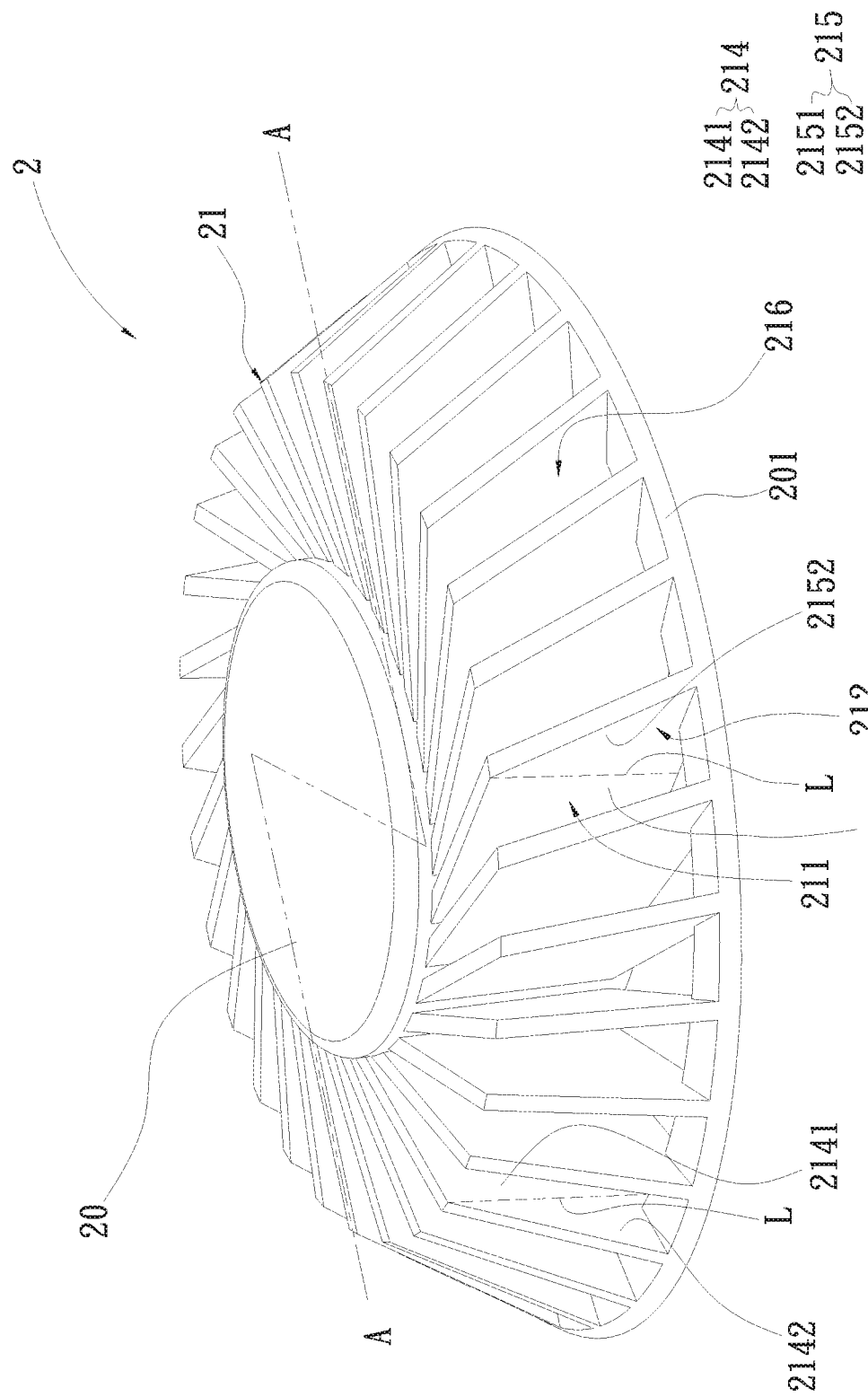
FIG. 3A is a perspective schematic view of the fan blade structure according to the first embodiment of the present invention.
Figure 3B:
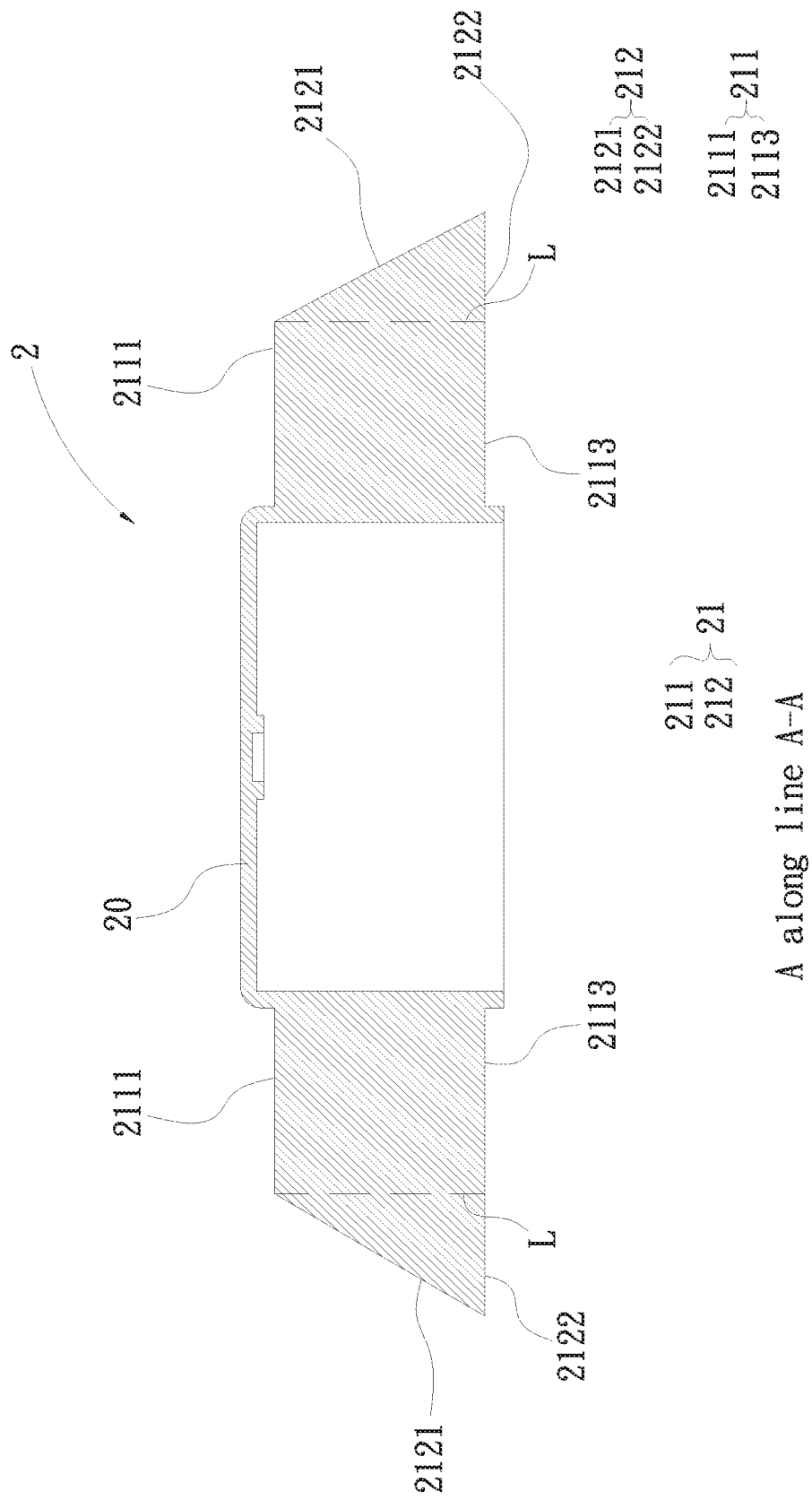
FIG. 3B is a cross-sectional schematic view of FIG. 3A along line A-A.
Figure 4B:
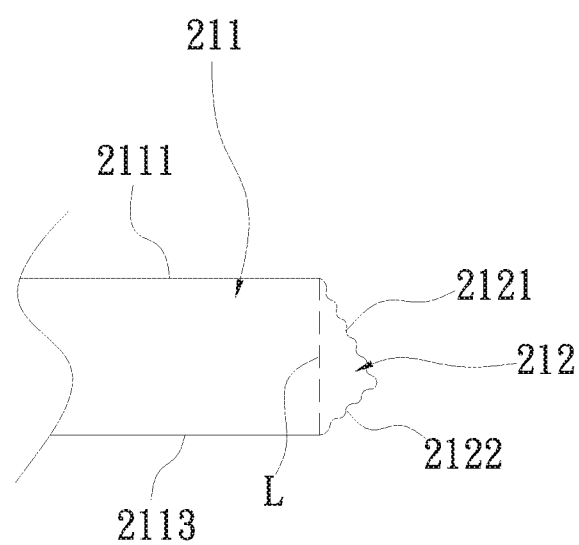
FIG. 4B is another aspect view of the fan blade structure according to the first embodiment of the present invention.

Referring to FIGS. 3A and 3B, the hub 20 is provided with a connecting portion 201 which is disposed on bottom sides 213 of the blades 21; the connecting portion 201 connects to the bottoms 213 of the blades 21 along the outer edge of the hub 20 to form a ring body. An air channel 216 is formed between any two adjacent blades 21. The air channel 216 is used to exhaust the air flow along the radial direction of the hub 20. The air channel 216 between any two adjacent blades 21 has the same shape as the corresponding opposite blade 21. For example, if the shape of each of the blades 21 has a trapezoid shape, the air channel 216 between any two adjacent blades 21 also has the trapezoid shape.

In an embodiment, the shapes of the blades 21 can be designed as irregular and thus the shape of the air channel 216 between any two adjacent blades 21 will has the irregular shape. In another embodiment, the connecting portion 201 of the hub 20 can be omitted.

Therefore, by means of the structure design of the shape of the above air channels 216 changing with the shapes of the blades 21, the air channels 216 can change the flow field of the outflowing air flow such that the air in the air channels 216 can flow outwards more smoothly and further improve the wind pressure effect. Moreover, the whole surface of the blades 21 and the area of the air channels 216 are both expanded through the second windward zone 2142 and the second leeward zone 2152 of the blades 21 such that the air flow can be effectively increased.

Thus, by means of the design of the fan blade structure 2 of the present invention, the air flow and the wind pressure can be effectively increased to effectively improve the cooling effect.

Figure 5:
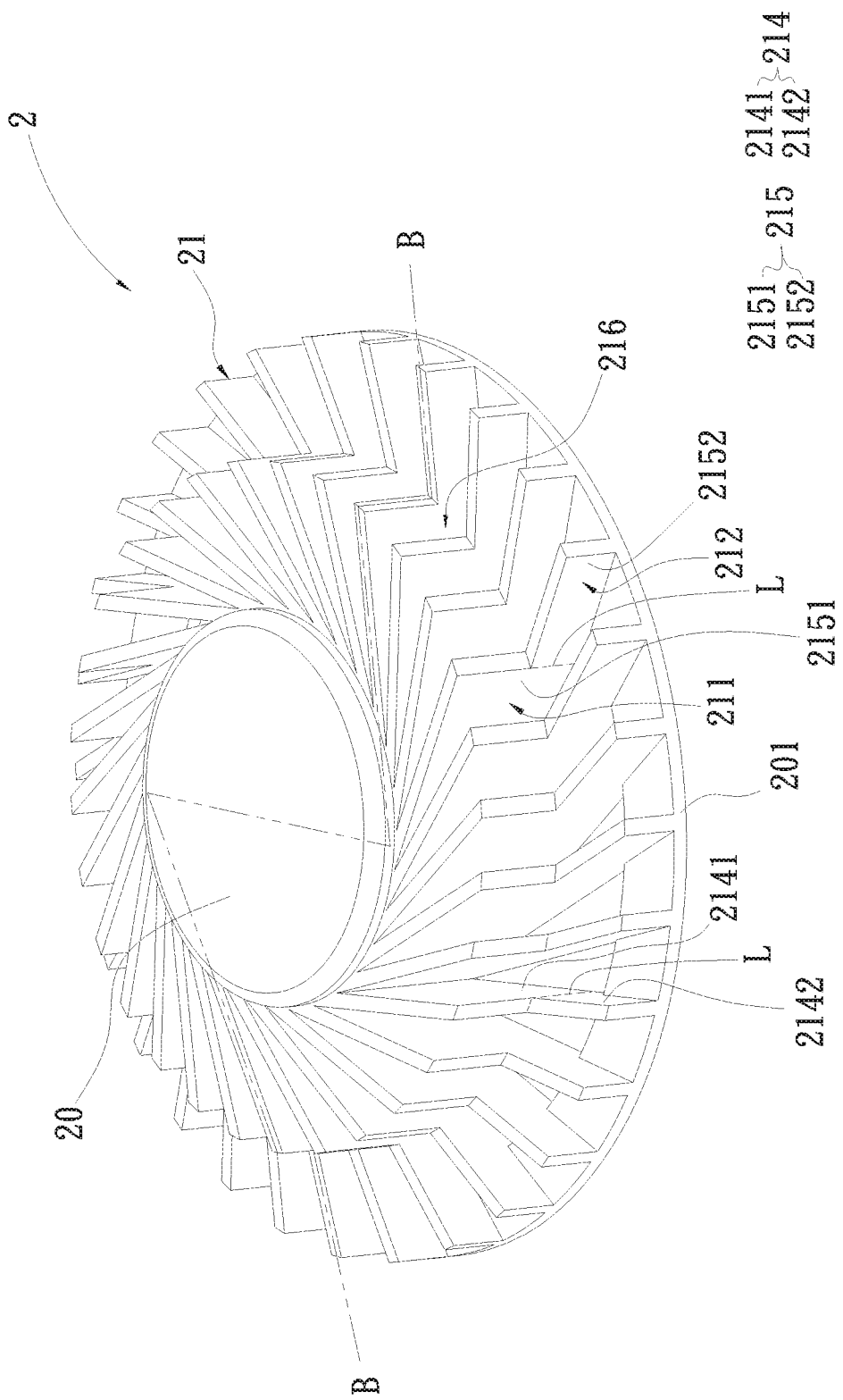
FIG. 5 is a perspective schematic view of the fan blade structure according to the second embodiment of the present invention.
Figure 5B:
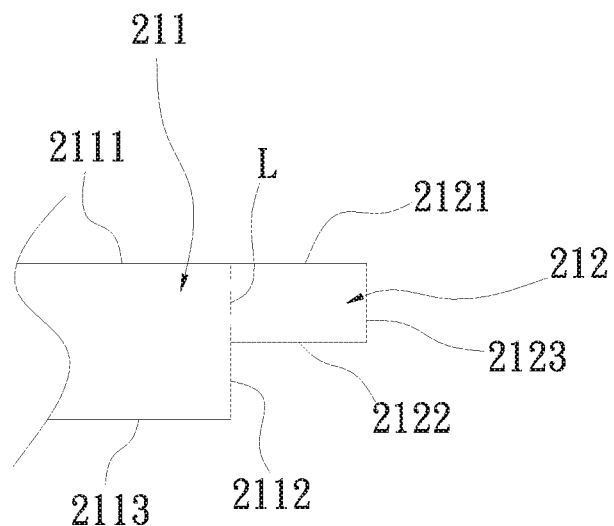
FIG. 5B is an aspect view of the fan blade structure according to the second embodiment of the present invention.
Figure 5C:
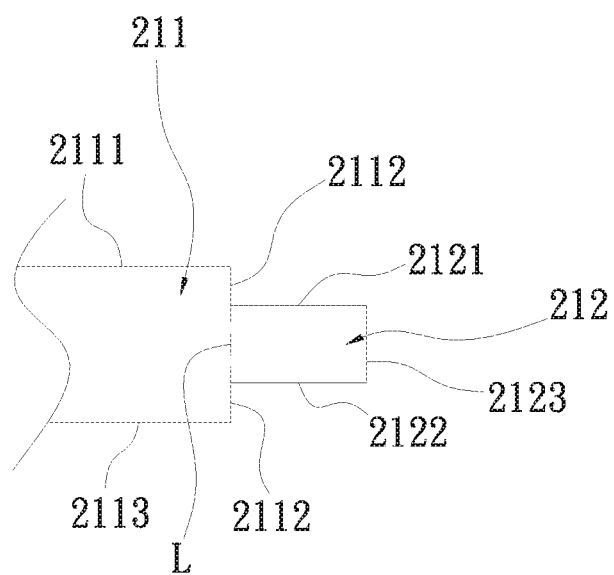
FIG. 5C is another aspect view of the fan blade structure according to the second embodiment of the present invention.

Please refer to FIG. 5 which is a perspective schematic view of the fan blade structure according to the second embodiment of the present invention, FIG. 5A which is a cross-sectional schematic view of FIG. 5 along line B-B, FIG. 5B which is an aspect view of the fan blade structure according to the second embodiment of the present invention, and FIG. 5C which is another aspect view of the fan blade structure according to the second embodiment of the present invention. The fan blade structure and the connecting relation of the current embodiment are the same as those of the first embodiment and will not be described again. In the current embodiment, the first portion 211 further has a side surface 2112; the second portion 212 further has a third side 2123 connecting to the first side 2121 and the second side 2122. That is, the first portion 211 has the above-mentioned top surface 2111, the above-mentioned bottom surface 2113, and the side surface 2112; one end of the side surface 2112 connects to the other end of the top surface 2111. The second portion 212 has the above-mentioned first side 2121, the above-mentioned second side 2122, and the third side 2123 connecting to one end of the first side 2121 and one end of the second side 2122. The other end of the first side 2121 and the other end of the second side 2122 connect to the other end of the side surface 2112 and the other end of the bottom surface 2113, respectively. As shown in FIG. 5, the surface area of the above-mentioned first portion 211 is the area sum of all the surfaces of the first portion 211 including the surfaces of the top surface 2111, the bottom surface 2113, the side surface 2112, and two sides of the first portion 211. The surface area of the second portion 212 is the area sum of all the surfaces of the second portion 212 including the surfaces of the first, the second, and the third sides 2121, 2122, 2123, and two sides of the second portion 212.

The first windward zones 2141 and the first leeward zone 2151 of the windward side 214 of each of the blades 21 are individually disposed on one side and the other side of the first portion 211 which is located between the virtual line L and the corresponding outer edge of the hub 20. The second windward zone 2142 and the second leeward zone 2152 are individually disposed on one side and the other side of the second portion 212 which is located between the virtual line L and the corresponding first, second, and third sides 2121, 2122, 2123. The shape of the first windward zone 2141 (or the first leeward zone 2151) of the first portion 211 is different from that of the second windward zone 2142 (or the second leeward zone 2152). For example, the shape of the first windward zone 2141 (or the first leeward zone 2151) of the first portion 211 has a rectangular shape; the second windward zone 2142 (or the second leeward zone 2152) of the second portion 212 has a rectangular shape. Also, the air channel 216 between any two adjacent blades 21 has the same shape as any corresponding opposite blade 21.

In an embodiment, referring to FIG. 5B, one end of the side surface 2112 of the first portion 211 connecting to the other end of the top surface 2111 is changed to the design of one end of the side surface 2112 of the first portion 211 connecting to the other end of the bottom surface 2113 as well as the other ends of the first and the second sides 2121, 2122 individually connecting to the other end of the top surface 2111 and the other end of the side surface 2112.

In another embodiment, referring to FIG. 5C, one side surface 2112 of the first portion 211 is changed to further comprise two side surfaces 2112. One ends of the two side surfaces 2112 connect to the other end of the top surface 2111 and the other end of the bottom surface 2113, respectively. The other end of the first side 2121 and the other end of the second side 2122 individually connect to the other ends of the two side surfaces 2112.

Therefore, in the above embodiments, by means of the structure design of the shapes of the above air channels 216 changing with the shapes of the blades 21, the air channels 216 can change the flow field of the outflowing air flow such that the air in the air channels 216 can flow outwards more smoothly and further improve the wind pressure effect. Moreover, the whole surface of the blades 21 and the area of the air channels 216 are both expanded through the second windward zone 2142 and the second leeward zone 2152 of the blades 21 such that the air flow and the wind pressure can be effectively increased to effectively enhance the cooling effect.

Figure 6:
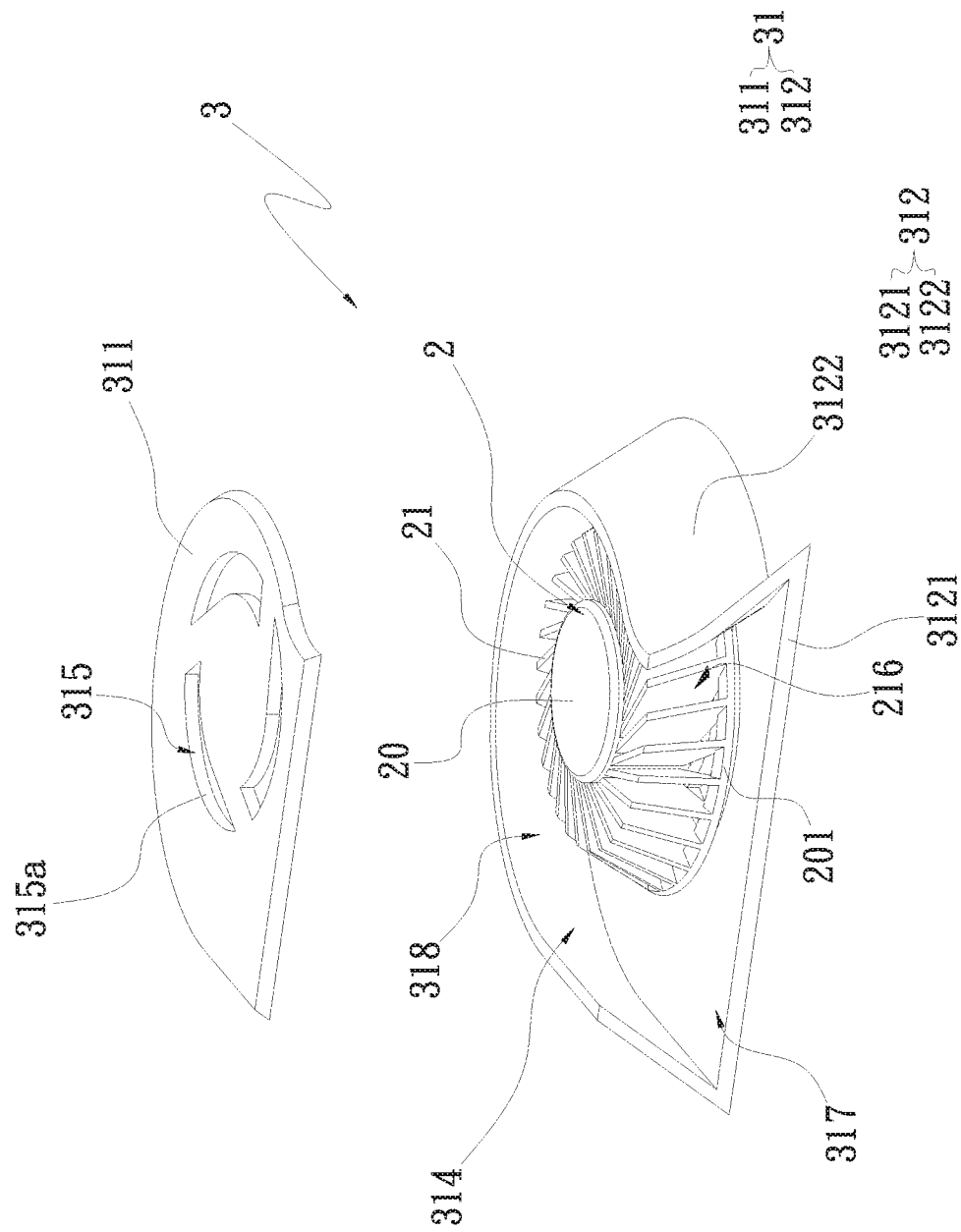
FIG. 6 is a perspective exploded schematic view of the centrifugal fan according to the third embodiment of the present invention.
Figure 7A:
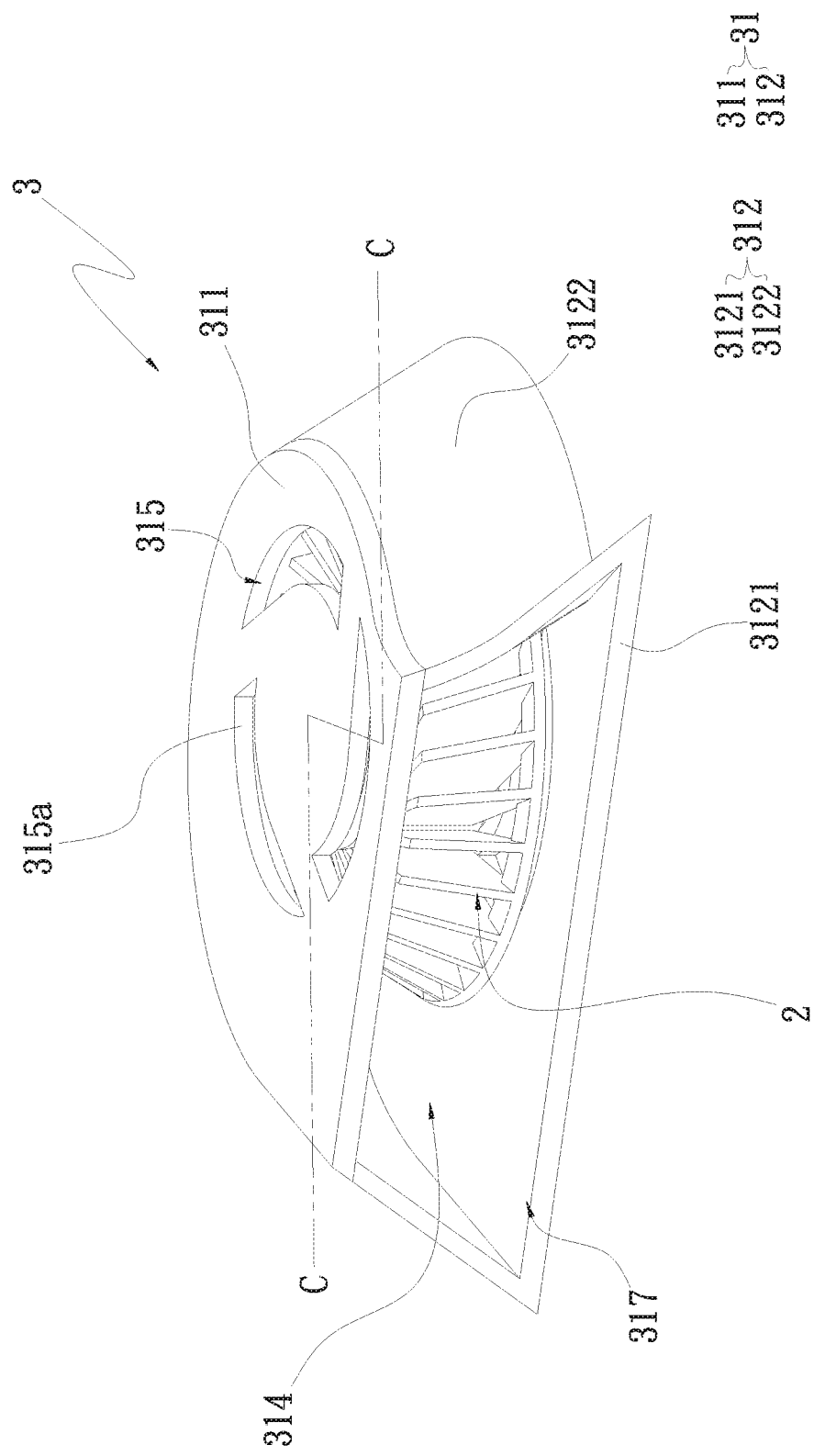
FIG. 7A is a combined perspective schematic view of the centrifugal fan according to the third embodiment of the present invention.
Figure 7B:
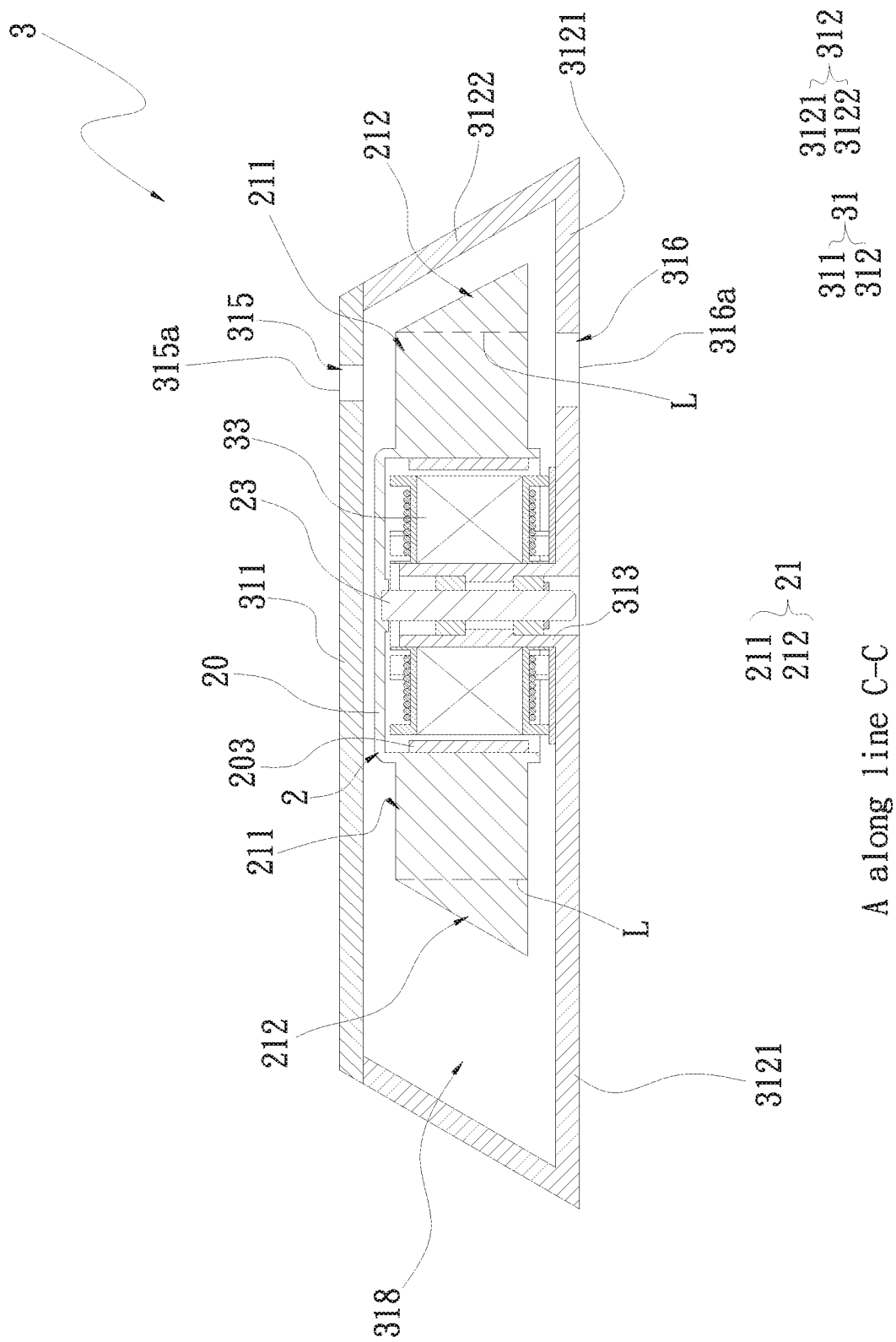
FIG. 7B is a cross-sectional schematic view of FIG. 7A along line C-C.

Please refer to FIG. 6 which is a perspective exploded schematic view of the centrifugal fan according to the third embodiment of the present invention, FIG. 7A which is a combined perspective schematic view of the centrifugal fan according to the third embodiment of the present invention, and FIG. 7B which is a cross-sectional schematic view of FIG. 7A along line C-C, also referring to FIG. 3A. The centrifugal fan 3 comprises a fan case 31 and a fan blade structure 2. The structure, the connecting relation, and the function of the fan blade structure 2 are the same as those of the fan blade structure 2 of the first embodiment and thus will not be described again. In the current embodiment, the fan case 31 has a trapezoid-like shape, only for explanation and not limited to this. The fan case 31 is provided with a top cover 311, a base case 312, a first inlet 315, a first inlet plane 315a around the first inlet 315, at least one outlet 317, and a shaft base 313. The top cover 311 is disposed on the base case 312. The top cover 311 and the base case 312 together define a receiving space 314. The receiving space 314 is used to receive the shaft base 312 and the fan blade structure 2. The first inlet 315 is disposed on the top cover 311 or on the base case 312. In the current embodiment, the first inlet 315 is disposed through the top cover 311 and communicates with the receiving space 314. The first inlet plane 315a and the outer surface of the top cover 311 are both on the same horizontal plane; the first inlet plane 315a is not vertical to the first side 2121 of the second portion 212 of the corresponding blade 21.

The base case 312 is provided a base plate 3121 and a side wall 3122 extending upwards from the base plate 3121. The shaft base 313 is disposed at the center of the base plate 3121 in the receiving space 314 and is pivoted on a shaft 23 disposed in the fan blade structure 2. Moreover, a magnetic part 203 disposed in the hub 20 of the fan blade structure 2 and the corresponding stator 33 sleeved around the shaft base 313 generate magnetic excitation. The side wall 3122 in the current embodiment extends obliquely from the edge of the adjacent base plate 3121 upwards and towards the receiving space 314 to connect to the top cover 311 correspondingly. The upper end of the side wall 3122 connects to one end of the top cover 311 correspondingly; the top cover 311 and the base plate 312 of the fan case 31 are individually not vertical to the side wall 3122. In the current embodiment, the cross-sectional shape of the side wall 3122 of the fan case 31 is the same as that of the first side 2121 of the second portion 212 of the corresponding blade 21. For example, the cross-sectional shapes of the side wall 3122 of the fan case 31 and the first side 2121 of the blade 21 are both oblique in the same direction (or both have stepped shapes or other shapes). In this way, the whole fan case 31 has an irregular appearance. The surface area of the top cover 311 (that is, the area sum of all the surface areas of the top cover 311) is smaller than the surface area of the base plate 3121 (that is, the area sum of all the surface areas of the base plate 3121).

In an alternative embodiment, the design of the side wall 3122 of the fan case 31 having the same cross-sectional shape as the first and the second sides 2121, 2122 of the second portion 212 of the corresponding blade 21 can be used.

Furthermore, the side wall 3122 is provided with the above-mentioned outlet 317 which communicates with the receiving space 314 and is used to exhaust the air flow from the fan case 31. An outside space 318 which is not vertical to a first inlet plane 315a around the first inlet 315 is formed between the inner side of the side wall 3122 of the fan case 31 and the opposite side (e.g., the first side 2121) of the second portion 212 of the blade 21 of the fan blade structure 2. In the current embodiment, the cross-sectional shape of the outside space 318 is oblique (refer to FIG. 7B), but not limited to this. In practice, the shape of the outside space 318 can change according to the appearance of the fan case 31 of the centrifugal fan 3. Therefore, by means of the centrifugal fan of the present invention applied in a system such as a notebook computer, a smart phone, a telematics system, an All-in-One system, a mini system, or a smart wearable device or IPAD (not shown), the fan case 31 of the centrifugal fan 3 is changeable in appearance (e.g., a trapezoidal shape) according to the change of the system. Further, the shape (e.g., a trapezoidal shape) of the blade 21 of the fan blade structure 2 and the shape of the outside space 318 (i.e., the cross-sectional shape of the outside space 318) also can change according to the appearance of the fan case 31. In this way, the centrifugal fan 3 has a flexible structure to be suitable for various systems to utilize the space in the system. For example, the space in a system for accommodating the centrifugal fan 3 is preferably suitable for a four-inch centrifugal fan. When some portion of the centrifugal fan 3 (e.g., the right upper portion of the centrifugal fan 3) is interfered with the electronic device or other apparatus (e.g., the cooling device or the hard disk drive) in the system, the four-inch centrifugal fan 3 can still be used in the system to effectively prevent the interference to obtain a better cooling effect by means of the changeable appearance of the fan case 31 of the centrifugal fan 3 of the present invention. For instance, the side wall 3122 of the fan case 31 inclines towards the top cover 311, upwards and inwards; the top cover 311 and the base plate 3121 have different surface areas. As a result, the system performance is improved.

The fan case 31 is provided with a second inlet 316 corresponding to the first inlet 315 and a second inlet plane 316a around the second inlet 316. The second inlet 316 is disposed through the base plate 3121 and communicates with the receiving space 314. The second inlet plane 316a and the outer surface of the base plate 3121 are both on the same horizontal plane; the second inlet plane 316a is not vertical to the first side 2121 of the second portion 212 of the blade 21 and to the outside space 318. In the current embodiment, the first inlet plane 315a is smaller than the second inlet plane 316a; the first inlet 315 is smaller than the second inlet 316, but not limited to this. Thus, by means of the design of different sizes of the first inlet plane 315a of the top cover 311 and the second inlet plane 316a of the base plate 3121, the smoothness of the flow field is improved and the air flow is effectively increased.

In an alternative embodiment, the design including the surface area of the top cover 311 being larger than that of the base plate 3121, the first inlet plane 315a being larger than the second inlet plane 316a, and the first inlet 315 being larger than the second inlet 316 can be used.

In another alternative embodiment, referring to FIGS. 5A, 5B, and 7B, the cross-sectional shape of the side wall 3122 of the fan case 31 of FIG. 7B is redesigned as a roughly stepped shape such that the fan case 31 has an irregular appearance. Also, the fan blade structure 2 is redesigned to choose the fan blade structure 2 in the second embodiment such that the outside space 318 is formed among the inner side of the side wall 3122 of the fan case 31, the third side 2123 of the second portion 212 of the opposite blades 21, and the side surface 2112 of the first portion 211. In yet another alternative embodiment, referring to FIGS. 5C and 7B, the cross-sectional shape of the side wall 3122 of the fan case 31 of FIG. 7B is redesigned as a roughly convex shape such that the fan case 31 has an irregular appearance and the outside space 318 is formed among the inner side of the side wall 3122 of the fan case 31, the third side 2123 of the second portion 212 of the opposite blades 21, and the two side surfaces 2112 of the first portion 211. The outside space 318 is not vertical to the first inlet plane 315a and the second inlet plane 316a.

Therefore, by means of the structure design of the centrifugal fan of the present invention, the efficiency of the centrifugal fan 3 can be effectively enhanced to improve the cooling effect. Besides, the problem about the determination of the centrifugal fan of a proper size for a prior art system can also be effectively overcome.

What is claimed is:

1. A fan blade structure, applied in a centrifugal fan, comprising:
   a hub and a plurality of blades, wherein the blades are disposed at an outer edge of the hub, wherein each of the blades has a first portion and a second portion, wherein a virtual line extends vertically between the first portion and the second portion, wherein the second portion extends outwards from one end of the first portion adjacent to the virtual line, wherein the surface area of the first portion is larger than or smaller than that of the second portion, wherein the fan blade structure is provided with a connecting portion which is disposed on a bottom side of the plurality of blades, wherein the connecting portion connects a bottom of the second portion of the blades to form a ring body, the ring body being spaced apart from the hub, and wherein the first portion has a top surface and a bottom surface, wherein one end of the top surface and one end of the bottom surface are attached at the outer edge of the hub, wherein the other end of the top surface and the other end of the bottom surface are disposed far away from the outer edge of the hub, wherein the second portion has a first side and a second side, wherein the first side extends obliquely and outwards from the other end of the top surface to connect to one end of the second side, wherein the other end of the second side horizontally or obliquely connects to the other end of the adjacent bottom surface.

2. The fan blade structure according to claim 1, wherein the virtual line extends downwards and vertically from the connection between the first side and the other end of the top surface to the bottom surface correspondingly.

3. The fan blade structure according to claim 1, wherein each of the blades is provided with a windward side and a leeward side corresponding to the windward side, wherein the windward side defines a first windward zone and a second windward zone shrinking gradually and outwards from the first windward zone, wherein the first and the second windward zones are disposed on one side of the first portion and on one side of the second portion, respectively, wherein the leeward side defines a first leeward zone and a second leeward zone shrinking gradually and outwards from the first leeward zone, wherein the first and the second leeward zones are disposed on the other side of the first portion and on the other side of the second portion, respectively, and correspond to the first and the second windward zones, respectively.

4. The fan blade structure according to claim 1, wherein an air channel is formed between any two adjacent blades, wherein the air channel has the same shape as the corresponding two adjacent blades, wherein the air channel has a trapezoid shape or an irregular shape.

5. A centrifugal fan, comprising:
   a fan case provided with a top cover, a base case, and a shaft base, wherein the top cover is disposed on the base case, wherein the top cover and the base case together define a receiving space receiving the shaft base, wherein a first inlet which is disposed on the top cover or on the base case communicates with the receiving space, the first inlet being disposed through the top cover, wherein the base case is provided with a base plate and a side wall extending upwards from the base plate, wherein the side wall is provided with at least one outlet which communicates with the receiving space; and
   a fan blade structure pivoted to the shaft base in the receiving space, wherein the fan blade structure comprises a hub and a plurality of blades disposed at an outer edge of the hub, wherein each of the blades has a first portion and a second portion, wherein a virtual line extends vertically between the first portion and the second portion, wherein the second portion extends outwards from one end of the first portion adjacent to the virtual line, wherein the surface area of the first portion is larger than or smaller than that of the second portion, wherein an outside space which is not vertical to a first inlet plane around the first inlet is formed between one side of the second portion of each of the blades and an opposite inner side of the side wall of the fan case, wherein the first inlet plane is not vertical relative to the one side of the second portion of the corresponding blade, and wherein the first portion has a top surface and a bottom surface, wherein one end of the top surface and one end of the bottom surface are attached at the outer edge of the hub, wherein the other end of the top surface and the other end of the bottom surface are disposed far away from the outer edge of the hub, wherein the second portion has a first side and a second side, wherein the first side extends obliquely and outwards from the other end of the top surface to connect to one end of the second side, wherein the first side face the inner side of the side wall of the fan case, wherein the other end of the second side horizontally or obliquely connects to the other end of the adjacent bottom surface.

6. The centrifugal fan according to claim 5, wherein the first inlet is disposed through the top cover, wherein the first inlet plane is not vertical to the one side of the second portion of the corresponding blade, wherein the side wall extends obliquely and upwards from the edge of an adjacent base plate toward the receiving space to connect to the top cover, wherein the shaft base is disposed at the center of the base plate in the receiving space.

7. The centrifugal fan according to claim 6, wherein the fan case is provided with a second inlet and a second inlet plane around the second inlet, wherein the second inlet is disposed through the base plate and communicates with the receiving space, wherein the second inlet plane is not vertical to the one side of the second portion of the corresponding blade and the outside space.

8. The centrifugal fan according to claim 7, wherein the surface area of the top cover is smaller than that of the base plate, wherein the first inlet plane is smaller than the second inlet plane.

9. The centrifugal fan according to claim 5, wherein the virtual line extends downwards and vertically from the connection between the first side and the other end of the top surface to the bottom surface correspondingly.

10. The centrifugal fan according to claim 5, wherein each of the blades is provided with a windward side and a leeward side corresponding to the windward side, wherein the windward side defines a first windward zone and a second windward zone shrinking gradually and outwards from the first windward zone, wherein the first and the second windward zones are disposed on one side of the first portion and on one side of the second portion, respectively, wherein the leeward side defines a first leeward zone and a second leeward zone shrinking gradually and outwards from the first leeward zone, wherein the first and the second leeward zones are disposed on the other side of the first portion and the other side of the second portion, respectively, and correspond to the first and the second windward zones, respectively.

11. The centrifugal fan according to claim 5, wherein an air channel is formed between any two adjacent blades, wherein the air channel has the same shape as the corresponding blade, wherein the air channel has a trapezoid shape or an irregular shape.

12. The centrifugal fan according to claim 5, wherein the hub is provided with a connecting portion which is disposed on bottom sides of the blades, wherein the connecting portion connects to the bottoms of the blades along the outer edge of the hub to form a ring body.

* * * * *